United States Patent [19]
Adams et al.

[11] Patent Number: 5,873,100
[45] Date of Patent: Feb. 16, 1999

[54] INTERNET BROWSER THAT INCLUDES AN ENHANCED CACHE FOR USER-CONTROLLED DOCUMENT RETENTION

[75] Inventors: Robert Theodore Adams, Lake Oswego; Iverson S. Vaughn, Beaverton; Nelson Kidder Jeffrey, Hillsboro, all of Oreg.

[73] Assignee: Intel Corporation, Santa Clara, Calif.

[21] Appl. No.: 772,162

[22] Filed: Dec. 20, 1996

[51] Int. Cl.[6] .................................................. G06F 17/30
[52] U.S. Cl. ........................ 707/204; 711/133; 711/134
[58] Field of Search .................................. 395/200–236; 707/1, 2, 3, 4, 9, 501, 204; 1/1; 711/133, 134

[56] References Cited

U.S. PATENT DOCUMENTS

| | | | |
|---|---|---|---|
| 5,586,264 | 12/1996 | Belknap et al. | 395/200.49 |
| 5,657,390 | 8/1997 | Elgamal et al. | 380/49 |
| 5,682,514 | 10/1997 | Yohe et al. | 711/133 |

FOREIGN PATENT DOCUMENTS

| | | | |
|---|---|---|---|
| 0771099A2 | 2/1997 | European Pat. Off. | 29/60 |

OTHER PUBLICATIONS

Gopal K Raghavan et al, A Domain Model of WWW Browsers, IEEE and 436–439, Sep. 1996.

Azer Bestavros et al, Application–Level Document Caching in the Internet, IEEE and 166–173, Apr. 1995.

Steven L Scott et al, Performance of Pruning–Cache Directories for Large–Scale Multiprocessors, IEEE and 520–534, May 1993.

*Primary Examiner*—Wayne Amsbury
*Assistant Examiner*—Srirama Channavajjala
*Attorney, Agent, or Firm*—Kenyon & Kenyon

[57] ABSTRACT

A browser for requesting and receiving documents from a network includes a cache which stores a plurality of documents and has a user-defined storage limit. At least one of the plurality of documents stored in the cache is designated as a keep document. When a document is requested and received from the network, it is stored in the cache. The cache then determines whether the amount of storage used by the cache exceeds the storage limit. If the storage limit is exceeded, the cache deletes the oldest documents not designated as keep documents until the amount of storage used by the cache is within the storage limit.

17 Claims, 3 Drawing Sheets es 5,873,100

INTERNET BROWSER THAT INCLUDES AN ENHANCED CACHE FOR USER-CONTROLLED DOCUMENT RETENTION

BACKGROUND OF THE INVENTION

The present invention is directed to an Internet browser that includes an enhanced cache for user-controlled document retention. More particularly, the present invention is directed to an Internet browser that includes an option to allow a user to specify the duration that documents should reside in the cache.

Accessing the Internet through a personal computer is rapidly increasing in popularity. One popular section of the Internet, referred to as the World Wide Web (the "Web"), includes multimedia home pages composed of text, graphics, and multimedia content such as sound and video.

The Web operates on a client/server model. The personal computer user runs a Web client, or browser, on their computer. The Web browser contacts a Web server and requests data information, referred to as documents. A document on the Web can include both Hypertext Markup Language ("HTML") files and embedded data that may be required by the HTML files. Examples of embedded data includes images, video files and audio files. The Web server locates and then sends the documents to the Web browser, which displays the documents on the computer by interpreting the HTML that is used to build home pages on the Web.

Many browsers exist for accessing the Web. Examples of browsers include the Netscape Navigator from Netscape Communication Corp. and the Internet Explorer from Microsoft Corp. The typical browsers include cache functions. A cache is a temporary storage area for network data (the actual data is stored on the network) that improves data throughput. A cache can be any combination of random access memory ("RAM") and nonvolatile storage, e.g., disk memory, flash memory, tape, etc. A typical cache includes expiration rules, which cause data to be removed when the cache storage becomes too large. A typical cache also includes consistency rules, which determine when the cache checks to see if the temporary copy of the data is up to date with the actual data on the network.

Referring to FIG. 1, a typical browser that includes a cache function is illustrated. Browser 8 is typically implemented in software and is executed on a general purpose computer (not shown). The general purpose computer includes a processor for executing the browser 8 software, and memory for storing the browser 8 software.

Browser 8 shown in FIG. 1 includes a browser interface 10, a resolver 12 and a cache control 16. Browser 8 is coupled to the Internet 14 through communication equipment (not shown) associated with the computer in a known manner. Browser 8 is also coupled to a disk drive 18 which is part of the computer. Cache control 16, resolver 12 and disk drive 18 together form a cache for browser 8. The cache uses disk drive 18 as storage, but it could also use any other combination of RAM and nonvolatile storage that is available to the general purpose computer.

A computer user 20 operates browser 8. Browser interface 10 is the graphical interface through which user 20 interacts with browser 8. User 20 requests and receives documents from Internet 14 through browser interface 10.

Resolver 12 intercepts all document requests from browser interface 10 and determines if the requested document is stored in disk 18. It does this by first requesting the document from cache control 16. Cache control 16 retrieves the document from disk 18 if the requested document is stored in disk 18, and sends the document to resolver 12 which in turn sends the document to browser interface 10. If the document is not stored in disk 18, cache control 16 informs resolver 12 of this. Resolver 12 then requests the document from Internet 14. When the document is received from Internet 14, it is sent to browser interface 10. A copy of the document is also sent to cache control 16 where it is stored in disk 18.

A typical cache in a browser has a limit to how much data cache control 16 can store in disk 18. For example, in one known browser, the amount of storage in disk 18 is limited to a user-definable number of megabytes of disk space. When the limit is reached, cache control 16 automatically deletes the oldest data in order to store new documents. Because a typical cache indiscriminately deletes data based on the duration of time that it has been stored, the embedded file part of a document can be deleted while the HTML file part of the document remains stored in the cache, and vice versa.

For various reasons, a user might want to always keep specific documents stored in the cache. For example, Web pages might become unavailable over the Internet, or might be unexpectedly deleted, or the user's connection to the Internet may be disrupted. In addition, a Web page server might be frequently overloaded so that a long delay is required when retrieving the Web page. If these Web pages are always stored in the cache, they are always available to user 20 regardless of their availability on the Internet, and are available without unnecessary delay. However, with existing browsers such as browser 8, this option is not available to user 20 because Web pages may be automatically deleted when the limit of storage available to cache control 16 in disk 18 is reached.

Based on the foregoing, there is a need for an Internet browser that includes an option to allow a user to specify how long documents should reside in the browser's cache.

SUMMARY OF THE INVENTION

One embodiment of the present invention is a browser for requesting and receiving documents from a network. The browser includes a cache which stores a plurality of documents and has a user-defined storage limit. At least one of the plurality of documents stored in the cache is designated as a keep document. When a document is requested and received from the network, it is stored in the cache. The cache then determines whether the amount of storage used by the cache exceeds the storage limit. If the storage limit is exceeded, the cache deletes the oldest documents not designated as keep documents until the amount of storage used by the cache is within the storage limit.

DETAILED DESCRIPTION

Figure 1:
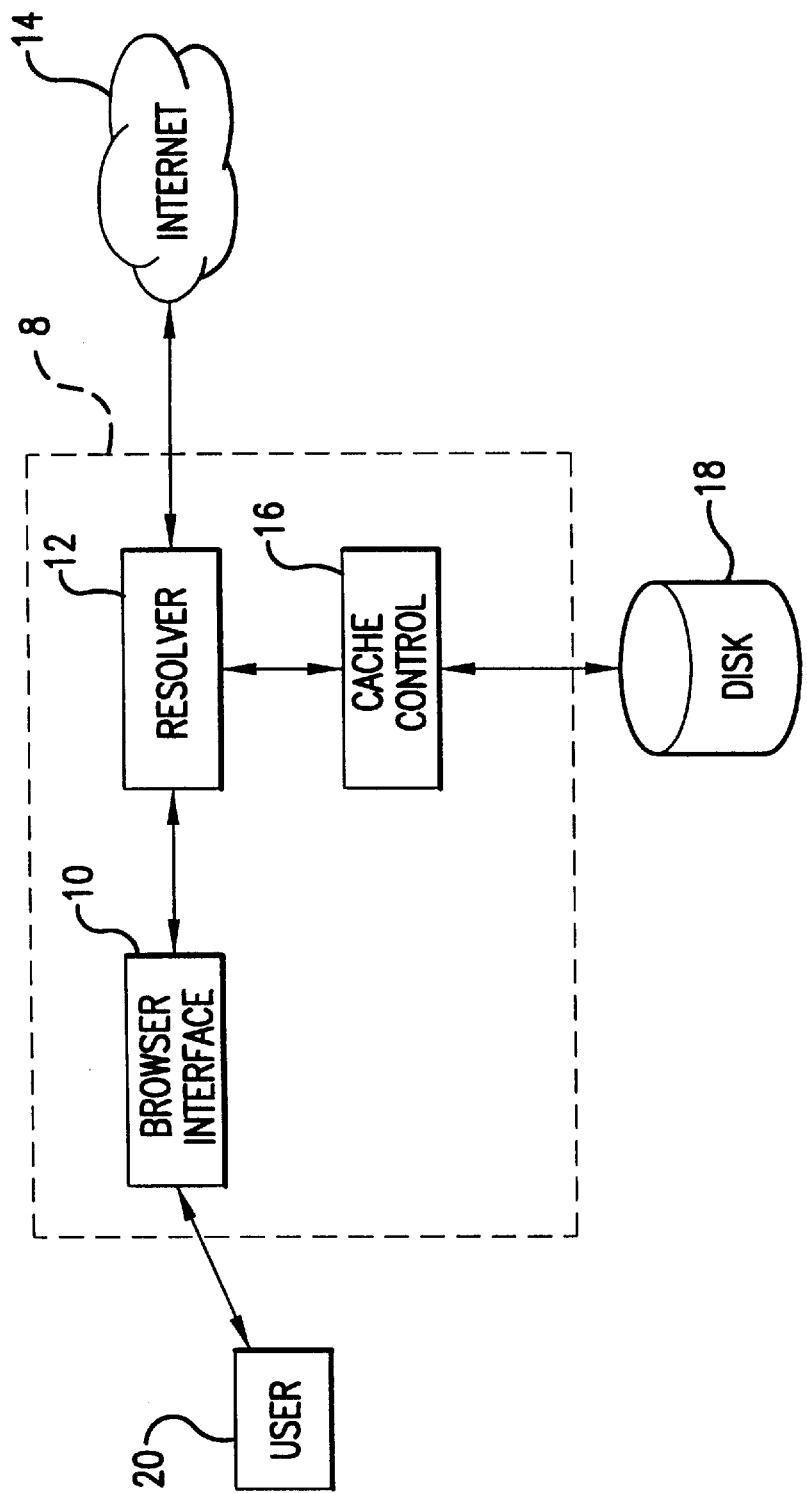
FIG. 1 is a block diagram illustrating a prior art browser that includes a cache.
Figure 2:
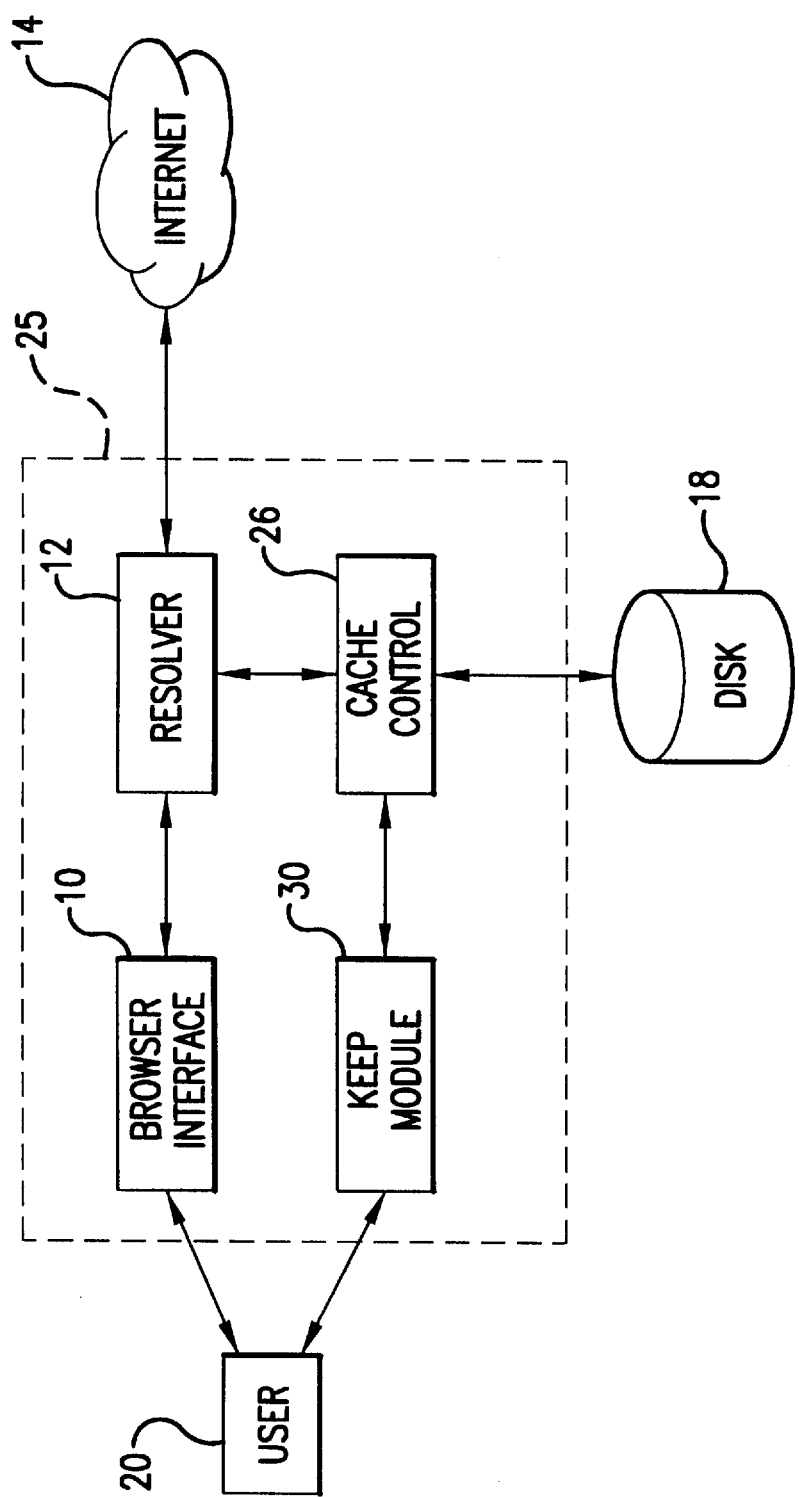
FIG. 2 is a block diagram illustrating an embodiment of a browser in accordance with the present invention.

Referring to FIG. 2, an embodiment of an Internet browser in accordance with the present invention is illustrated. Browser 25 is similar to browser 8 illustrated in FIG.

1, except that browser 25 includes a keep module 30 coupled to cache control 26 and available to user 20. Keep module 30 allows user 20 to select Web pages and other documents from Internet 14 that will not be automatically deleted from the cache when the user-defined limit in disk 18 is reached. The selected documents are designated as "keep" documents, and are stored by cache control 26 in disk 18 until user 20 indicates that they are no longer needed. Because the entire document is selected by user 20, both the HTML files and the embedded data are stored in the cache if they are included as part of the keep document.

Keep module 30 in one embodiment is integrated with browser interface 10 in a known manner to provide an option for user 20 when a document is requested through browser interface 10. At the time of the request, user 20 can designate the document as a keep document. In another embodiment, keep module 30 is a separate interface available to user 20. Keep module 30 also allows user 20 to designate any documents already stored in disk 18 by cache control 26 as keep documents.

In an additional embodiment, keep module 30 includes an option that allows user 20 to designate a document as a non-keep document. In a further embodiment, keep module 30 allows the user 20 to limit the time-frame that a document is designated as a keep document. For example, user 20 can designate a document as a keep document for three months. When the three months have expired, the document will revert to being a non-keep document.

Cache control 26 receives information about which documents are keep documents from keep module 30. In one embodiment, cache control 26 maintains a table of which documents are designated as keep documents. Further, cache control 26 may maintain a table of embedded data that is stored as part of the keep documents. When a new document is designated as a keep document, and that document includes embedded data that is already part of a prior designated keep document, cache control 26 will link the previously designated embedded data with the new document so duplicate copies of embedded data are not prevented from being deleted on disk 18.

In one embodiment, browser interface 10, resolver 12, keep module 30 and cache control 26 are implemented as software modules that are stored in a memory device and executed by a processor in a general purpose computer. The software modules are coupled to each other through application program interfaces ("APIs").

Figure 3:
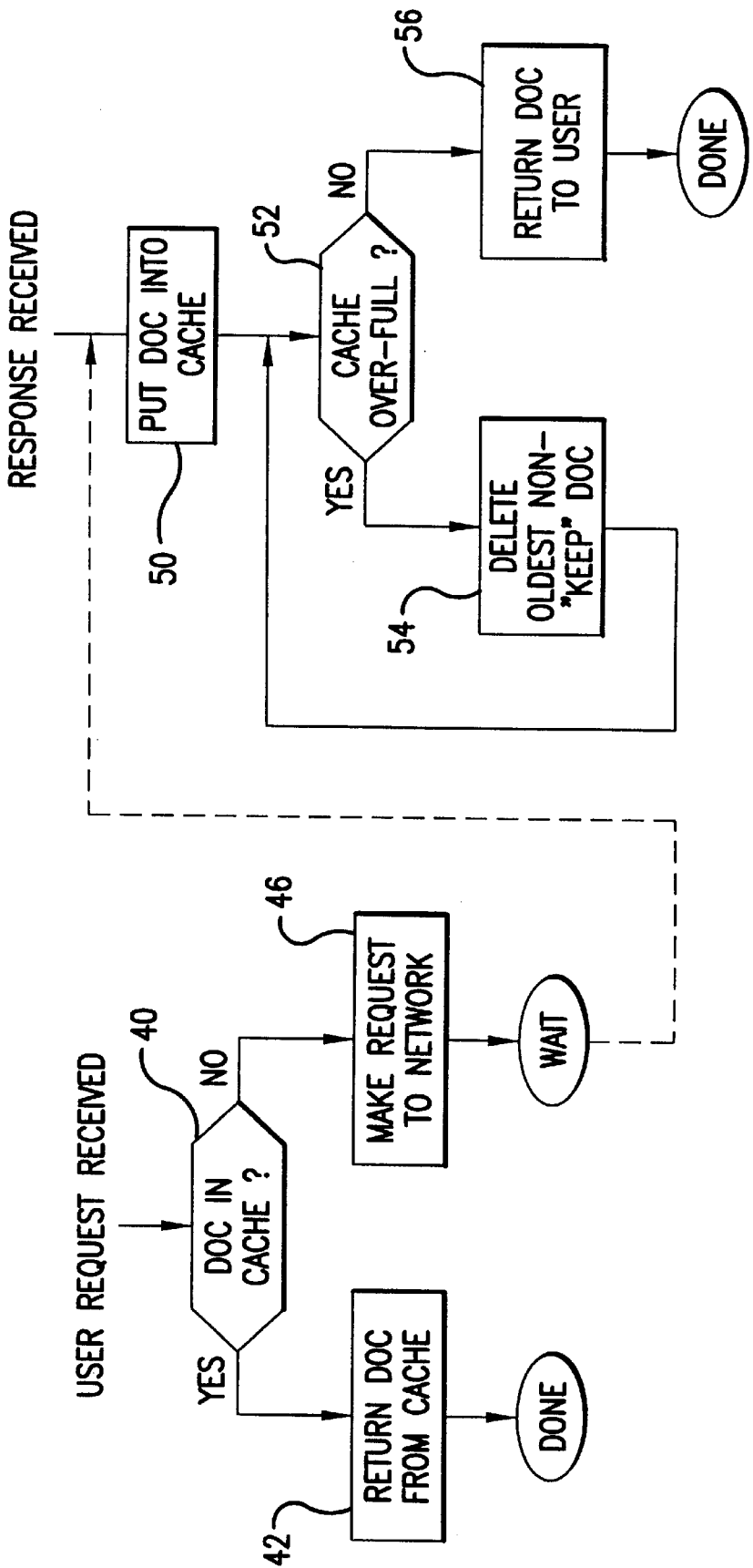
FIG. 3 is a flow diagram of steps performed by an embodiment of a browser in accordance with the present invention.

FIG. 3 is a flow diagram illustrating the steps performed by browser 25 in response to receiving a request for an Internet document from user 20. These steps are performed regardless of whether the requested document is designated as a keep document by user 20. Although not illustrated as a step, if the requested document is designated as a keep document, cache control 26 will add the requested document to its list of keep documents.

At step 40, browser 8 determines whether the requested document is in the cache of browser 8, i.e., whether the document has been stored in disk 18 by cache control 26.

If the requested document is stored in the cache, at step 42 the document is retrieved from the cache and made available to user 20 through browser interface 10.

If the requested document is not stored in the cache, at step 46 browser 8 requests the document from Internet 14 and then waits until the requested document is received from Internet 14.

At step 50, after the document is received from Internet 14, a copy of the document is stored in the cache. At step 52, cache control 26 determines whether the cache is overfilled, i.e., the cache storage in disk 18 has exceeded the user-defined limit. If it has, at step 54 cache control 26 deletes the oldest non-keep document. Step 52 is then repeated until storage space is within the user-defined limit. For example, if five megabytes is the user-defined limit, step 52 is repeated until the amount of space used in disk 18 to store all of the cache documents is no greater than five megabytes.

If at step 54 there are no non-keep documents to delete, i.e., the entire user-defined limit is composed on keep document, cache control 26 provides this information to keep module 30. Keep module 30 alerts user 20 of the situation and provides user 20 with a choice of either to increase the user-defined limit, or remove the "keep" designation from some of the stored documents.

When the cache is not overfilled at step 52, at step 56 the requested document is made available to user 20 through browser interface 10.

In an alternative embodiment, step 56 is executed as soon as the document is received from Internet 14. Steps 50, 52 and 54 then follow step 56 in this embodiment.

As described, browser 25 of the present invention allows a user to define how long a document will reside in the browser's cache. This enables the user to have access to the document even if the document is no longer available on the Internet, or if the user's connection to the Internet is disrupted. Further, because browser 25 allows a user to select the entire document as a keep document, both the HTML file part and the embedded data part of the document will remain in the cache if desired by the user.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, although the present invention was described in connection with the Internet, it can also be used for accessing any other type of network.

What is claimed is:

1. A method of operating a network browser for requesting and receiving documents from a network, wherein the browser includes a cache which stores a plurality of documents and the cache has a user-defined storage limit, comprising the steps of:

(a) designating at least one of the plurality of documents stored in the cache as a keep document;

(b) requesting a first document;

(c) receiving the first document from the network;

(d) storing the first document in the cache;

(e) determining if the amount of storage used by the cache exceeds the storage limit; and (f) deleting the oldest documents in the cache that are not designated as keep documents until the amount of storage used by the cache is within the storage limit if at step (e) it is determined that the amount of storage used by the cache exceeds the storage limit.

2. The method of claim 1, further comprising the step of:

(g) providing the first document to a user of the browser.

3. The method of claim 2, further comprising the step of:

(h) storing a list of keep documents stored in the cache.

4. The method of claim 3, wherein step (a) comprises the step of providing an interface that allows the user of the browser to select the at least one of the stored plurality of documents as the keep document.

5. The method of claim 3, wherein step (a) comprises the step of providing an interface that allows the user of the browser to request a second document and specify that the second document is the keep document when stored in the cache.

6. The method of claim 1, wherein the document comprises Hypertext Markup Language (HTML) files and embedded data.

7. A computer-readable medium having stored thereon instructions which, when executed by a processor, cause the processor to perform steps for operating a network browser for requesting and receiving documents from a network, wherein the browser includes a cache which stores a plurality of documents and the cache has a user-defined storage limit, the steps comprising:

(a) designating at least one of the plurality of documents stored in the cache as a keep document;

(b) requesting a first document;

(c) receiving the first document from the network;

(d) storing the first document in the cache;

(e) determining if the amount of storage used by the cache exceeds the storage limit; and (f) deleting the oldest documents in the cache that are not designated as keep documents until the amount of storage used by the cache is within the storage limit if at step (e) it is determined that the amount of storage used by the cache exceeds the storage limit.

8. The computer-readable medium of claim 7, the steps further comprising:

(g) providing the first document to a user of the browser.

9. The computer-readable medium of claim 8, the steps further comprising:

(h) storing a list of keep documents stored in the cache.

10. The computer-readable medium of claim 9, wherein step (a) comprises the step of providing an interface that allows the user of the browser to select the at least one of the stored plurality of documents as the keep document.

11. The computer-readable medium of claim 9, wherein step (a) comprises the step of providing an interface that allows the user of the browser to request a second document and specify that the second document is the keep document when stored in the cache.

12. The computer-readable medium of claim 6, wherein each of the plurality of documents comprise Hypertext Markup Language (HTML) files and embedded data.

13. A browser for allowing a user to request and receive documents from a network, said browser comprising:

a cache adapted to store a plurality of documents in a storage device, wherein said cache has a user-defined limit of the amount storage used to store the documents in the storage device; and a keep module coupled to said cache that allows the user to designate at least one of the plurality of documents stored by said cache as a keep document;

wherein said cache is adapted to delete from the storage device only documents not designated as keep documents.

14. The browser of claim 13, further comprising a browser interface coupled to said cache.

15. The browser of claim 14, wherein said cache comprises:

a resolver coupled to said browser interface; and a cache control coupled to said resolver and the disk.

16. The browser of claim 15, wherein said cache deletes the oldest document not designated as a keep document when said user-defined limit is exceeded.

17. The browser of claim 13, wherein each of the plurality of documents comprise Hypertext Markup Language (HTML) files and embedded data.

* * * * *